(12) United States Patent
Ohashi et al.

(10) Patent No.: US 12,307,591 B2
(45) Date of Patent: May 20, 2025

(54) ELEMENT DATA MANAGEMENT APPARATUS, ELEMENT DATA MANAGEMENT METHOD, PROGRAM, AND DATA STRUCTURE OF ELEMENT DATA

(71) Applicant: SONY INTERACTIVE ENTERTAINMENT INC., Tokyo (JP)

(72) Inventors: Yoshinori Ohashi, Tokyo (JP); Takayuki Ochi, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 274 days.

(21) Appl. No.: 17/615,148

(22) PCT Filed: Jun. 21, 2019

(86) PCT No.: PCT/JP2019/024817
§ 371 (c)(1),
(2) Date: Nov. 30, 2021

(87) PCT Pub. No.: WO2020/255409
PCT Pub. Date: Dec. 24, 2020

(65) Prior Publication Data
US 2022/0237865 A1 Jul. 28, 2022

(51) Int. Cl.
*G06T 17/00* (2006.01)
*G06F 16/22* (2019.01)
(Continued)

(52) U.S. Cl.
CPC ........ *G06T 17/005* (2013.01); *G06F 16/2246* (2019.01); *G06T 11/001* (2013.01); *G06T 17/20* (2013.01); *G06T 2215/12* (2013.01)

(58) Field of Classification Search
None
See application file for complete search history.

(56) References Cited

U.S. PATENT DOCUMENTS 8,831,356 B2 * 9/2014 Murata .............. H04N 21/8583
382/195
2018/0188045 A1 * 7/2018 Wheeler .......... G08G 1/096827
(Continued)

FOREIGN PATENT DOCUMENTS

| JP | 2009169845 A | 7/2009 |
| JP | 2018156482 A | 10/2018 |
| WO | 2019069524 A | 4/2019 |

OTHER PUBLICATIONS

International Search Report and Written Opinion mailed Sep. 17, 2019, from PCT/JP2019/024817, 7 sheets.

*Primary Examiner* — Sarah Le
(74) *Attorney, Agent, or Firm* — XSENSUS LLP

(57) ABSTRACT

The present invention provides an element data management apparatus, an element data management method, a program, and a data structure of element data for improving the utility value of environmental maps. An element data storage section (40) stores at least one piece of element data including environment data generated on the basis of sensing data acquired by a tracker and including sensing time point data associated with a time range in which an element represented by the environment data is estimated to be present in real space on the basis of a time point at which the element was sensed. According to environment data generated on the basis of new sensing data, an element data updating section (48) identifies the element data associated with additional environment data constituting a portion or all of the environment data. The element data updating section (48) associates the element data including the additional environment data with the identified element data.

15 Claims, 9 Drawing Sheets

(51) Int. Cl.
  *G06T 11/00*  (2006.01)
  *G06T 17/20*  (2006.01)

(56) References Cited

U.S. PATENT DOCUMENTS

| | | | |
|---|---|---|---|
| 2018/0267540 A1* | 9/2018 | Sonoura | B60W 60/00274 |
| 2019/0279005 A1* | 9/2019 | Ogale | G05D 1/0221 |
| 2019/0371067 A1* | 12/2019 | Simari | G06T 19/20 |
| 2020/0364199 A1* | 11/2020 | Engrav | G06Q 10/06314 |
| 2021/0187391 A1* | 6/2021 | Ekkati | G06T 15/00 |

\* cited by examiner

ELEMENT DATA MANAGEMENT APPARATUS, ELEMENT DATA MANAGEMENT METHOD, PROGRAM, AND DATA STRUCTURE OF ELEMENT DATA

TECHNICAL FIELD

The present invention relates to an element data management apparatus, an element data management method, a program, and a data structure of element data.

BACKGROUND ART

There is a known technology of simultaneous localization and mapping (SLAM) for estimating the position of a tracker and generating an environmental map thereby.

The SLAM technology involves identifying feature points on the basis of sensing data acquired by a tracker, such as images captured by a camera included in the tracker. On the basis of the identified feature points and a previously stored environmental map, the position or the direction of the tracker is estimated and the environmental map is updated.

Also, there is known a life log technology by which the life experiences of a person are recorded as digital data such as images, sounds, and position information.

SUMMARY

Technical Problem

The inventors have been studying inclusion of environmental maps as a portion of the life log in order to display the environmental map at a reproduction time point designated by a user.

However, the existing environmental maps do not have their elements at multiple time points associated with each other. This has prevented the utility value of the environmental maps from being fully appreciated.

The present invention has been made in view of the above circumstances. An object of the invention is therefore to provide an element data management apparatus, an element data management method, a program, and a data structure of element data for improving the utility value of environmental maps.

Solution to Problem

In solving the above problem and according to the present invention, there is provided an element data management apparatus including an element data storage section configured to store at least one piece of element data that includes environment data generated on the basis of sensing data acquired by a tracker and that includes sensing time point data associated with a time range in which an element represented by the environment data is estimated to be present in real space on the basis of a time point at which the element was sensed, an element data identification section configured to identify the element data associated with additional environment data constituting a portion or all of environment data generated on the basis of new sensing data, and an association section configured to associate the element data including the additional environment data with the identified element data.

According to an aspect of the present invention, the element data management apparatus further includes a reproduction time point reception section configured to receive designation of reproduction time point as a time point at which an environmental map is to be reproduced, a reproduced element identification section configured to identify, from a plurality of pieces of the element data stored the element data storage section, a plurality of pieces of reproduced element data including the sensing time point data associated with a time range including, the reproduction time point, and an environmental map reproduction section configured to generate an environmental map at the reproduction time point by combining the environment data included in each of the identified plurality of pieces of the reproduced element data.

In the above aspect, the element data may include a link to other element data. The reproduced element identification section may recursively execute a process of identifying, from among the other element data referenced by the link included in the element data, the element data including the sensing time point data associated with the time range including the reproduction time point, starting from the element data constituted by a given root element. The environmental map reproduction section may generate the environmental map at the reproduction time point by combining the environment data included in each of the plurality of pieces of the reproduced element data identified by the recursive execution of the process.

Further, the time range associated with the sensing time point data included in the element data may include a time range associated with the sensing time point data included in the element data referenced by the link included in the element data.

In another aspect of the present invention, a plurality of pieces of element data stored in the element data storage section constitute a network structure such that the longer a time range of any one of the plurality of pieces of element data associated with the sensing time point data included in the element data, the closer that piece of element data is arranged to a root side and that the shorter the time range of a given piece of element data, the closer that piece of element data is arranged to a leaf side.

Also, the element data indicative of a mesh may be associated with a plurality of pieces of texture data each indicative of a texture associated with a time slot. The environmental map reproduction section may generate an environmental map formed by pasting, on the mesh indicated by the reproduced element data, the texture indicated by the texture data associated with a time slot to which the reproduction time point belongs, the texture data being associated with the reproduced element data. Alternatively, the element data indicative of a mesh may be associated with a plurality of pieces of vertex color data each indicative of a vertex color associated with time slot. The environmental map reproduction section may generate an environmental map formed by setting a color indicated by the vertex color data associated with a time slot to which the reproduction time point belongs for a vertex of a mesh indicated by the reproduced element data, the vertex color data being associated with the reproduced element data.

According to still another aspect of the present invention, the element data management apparatus further includes a disappearing element identification section configured to identify, in a latest environmental map based on at least one piece of the element data stored in the element data storage section, a disappearing element that appears in the environmental map but does not appear in the environment data based on the sensing data, and a deletion section configured to delete the disappearing element from the element data in which a portion of the disappearing element appears, the element data being stored in the element data storage section. The association section generates new element data including disappearing environment data representing the disappearing element and the sensing time point data associated with a time range in which the disappearing element is estimated to be present in real space on the basis of the time point at which the disappearing element was sensed, the association section further associating the new element data with the element data in which a portion of the disappearing element appears.

Also, according to the present invention, there is provided an element data management method including, given at least one piece of element data including environment data generated on the basis of sensing data acquired by a tracker and including sensing time point data associated with a time range in which an element represented by the environment data is estimated to be present in real space on the basis of a time point at which the element was sensed, the at least one piece of the element data being stored in an element data storage section, a step of identifying the element data associated with additional environment data constituting a portion or all of environment data generated on the basis of new sensing data, and a step of associating the element data including the additional environment data with the identified element data.

Also, according to the present invention, there is provided a program for causing a computer to execute, given at least one piece of element data including environment data generated on the basis of sensing data acquired by a tracker and including sensing time point data associated with a time range in which an element represented by the environment data is estimated to be present in real space on the basis of a time point at which the element was sensed, the at least one piece of the element data being stored in an element data storage section, a procedure of identifying the element data associated with additional environment data constituting a portion or all of environment data generated on the basis of new sensing data, and a procedure of associating the element data including the additional environment data with the identified element data.

Also, according to the present invention, there is provided a data structure of element data, including environment data generated on the basis of sensing data indicative of a result of sensing by a tracker, sensing time point data associated with a time range in which an element represented by the environment data is estimated to be present in real space on the basis of a time point at which the element was sensed, and a link to other element data. A time range associated with the sensing time point data included in the element data includes a time range associated with the sensing time point data included in the element data referenced by the link included in the element data.

DESCRIPTION OF EMBODIMENT

One preferred embodiment of the present invention is described below in detail with reference to the accompanying drawings.

Figure 1:
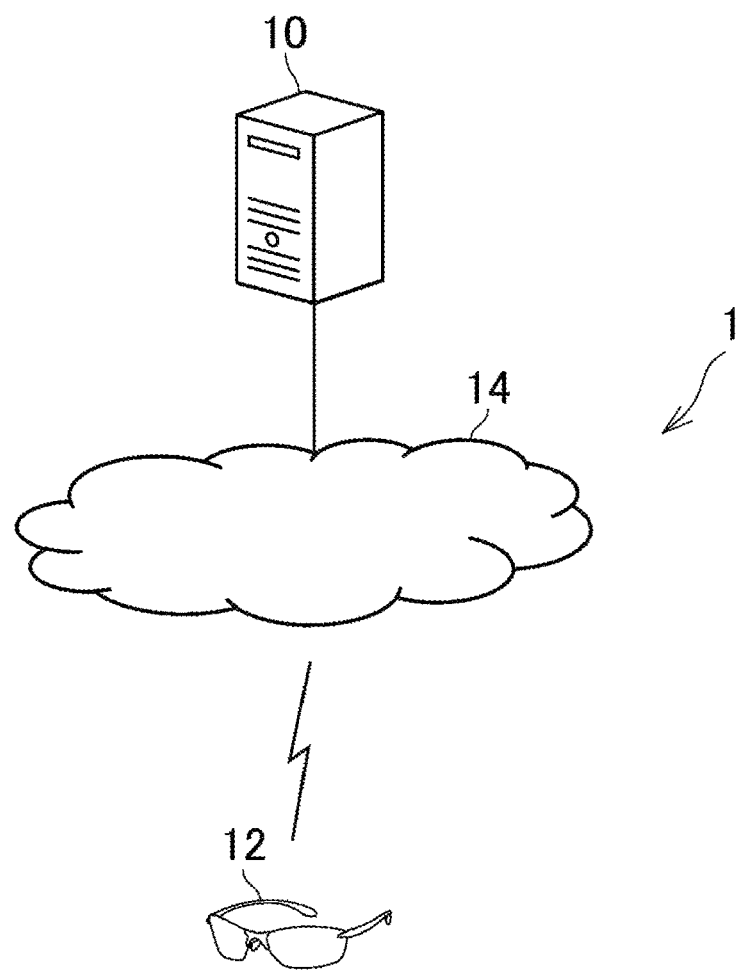
FIG. 1 is a configuration diagram depicting an example of an environmental map management system according to one embodiment of the present invention.

FIG. 1 is a configuration diagram depicting an example of an environmental map management system 1 according to one embodiment of the present invention. As depicted in FIG. 1, the environmental map management system 1 of the present embodiment includes a server 10 and a tracker 12.

The server 10 and the tracker 12 are connected to a computer network 14 such as the Internet. In the present embodiment, the server 10 and the tracker 12 can communicate with each other.

The server 10 of the present embodiment is, for example, a server computer used by a user of the environmental map management system 1.

Figure 2A:
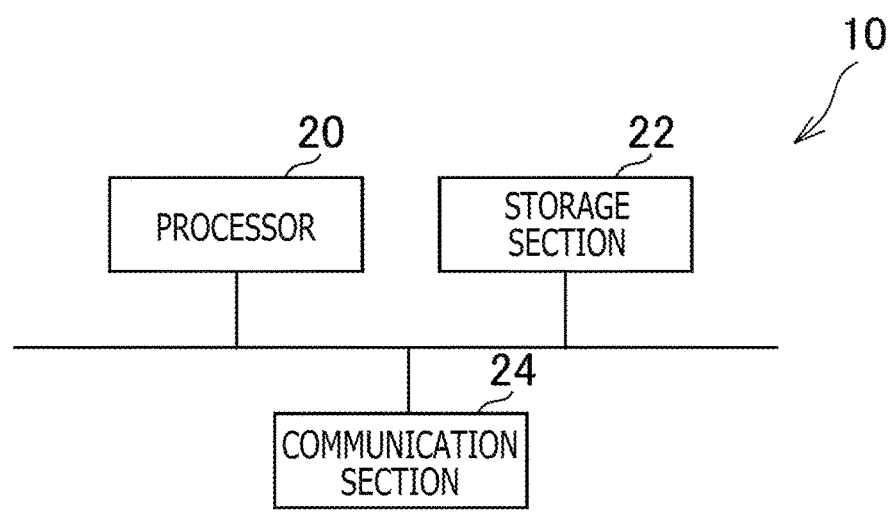
FIG. 2A is a configuration diagram depicting an example of a server according to one embodiment of the present invention.

As depicted in FIG. 2A, the server 10 of the present embodiment includes a processor 20, a storage section 22, and a communication section 24. The processor 20 is a program-controlled device such as a central processing unit (CPU) operating according to programs installed in the server 10, for example. The storage section 22 is a storage device, such as a read only memory (ROM) or a random access memory (RAM), or a hard disk drive, for example. The storage section 22 stores programs and the like to be executed by the processor 20. The communication section 24 is a communication interface such as a network board or a wireless local area network (LAN) module.

The tracker 12 of the present embodiment is an apparatus that tracks the position and the direction of the user wearing the tracker 12.

Figure 2B:
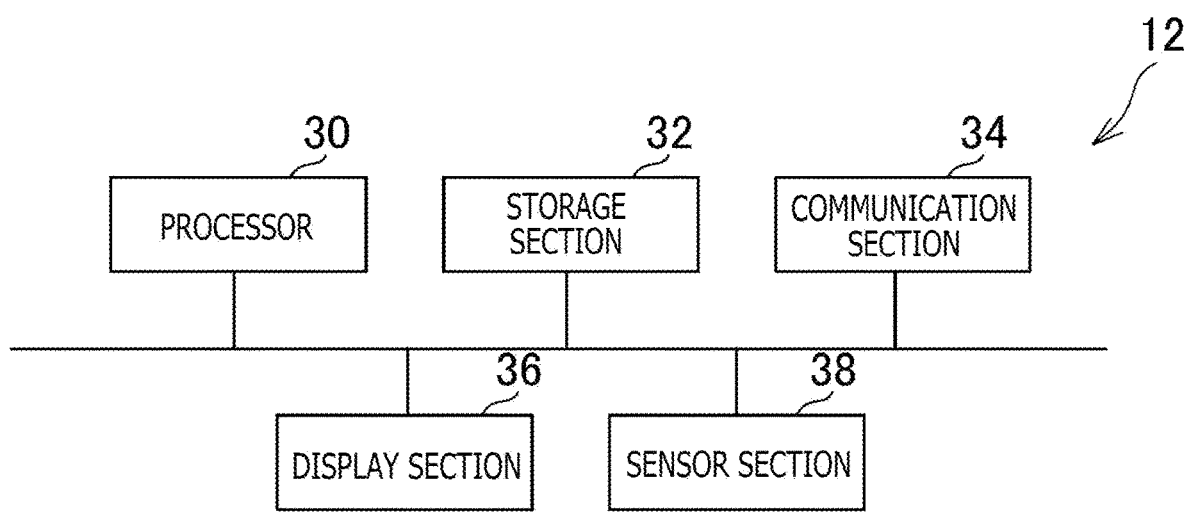
FIG. 2B is a configuration diagram depicting an example of a tracker according to one embodiment of the present invention.

As depicted in FIG. 2B, the tracker 12 of the present embodiment includes a processor 30, a storage section 32, a communication section 34, a display section 36, and a sensor section 38.

The processor 30 is, for example, a program-controlled device such as a microprocessor operating according to programs installed in the tracker 12. The storage section 32 is a storage device such as a memory. The storage section 32 stores programs and the like to be executed by the processor 30. The communication section 34 is a communication interface such as a wireless LAN module.

The display section 36 is a display such as a liquid-crystal display or an organic electroluminescent (EL) display arranged at the front of the tracker 12. The display section 36 of the present embodiment can display a three-dimensional image by presenting a left-eye image and a right-eye image, for example. Alternatively, the display section 36 may be configured to display not three-dimensional images but two-dimensional images only.

The sensor section 38 is a set of sensors including, for example, a camera, an inertial sensor (inertial measurement unit (IMU)), a geomagnetic sensor (direction sensor), a global positioning system (GPS) module, and a depth sensor. The camera included in the sensor section 38 captures images at a predetermined sampling rate, for example. The geomagnetic sensor included in the sensor section 38 outputs, to the processor 30, data indicative of the direction in which the tracker 12 is oriented, at a predetermined sampling rate. The inertial sensor included in the sensor section 38 outputs data indicative of the acceleration, the amount of rotation, and the amount of displacement of the tracker 12 to the processor 30 at a predetermined sampling rate. The GPS module included in the sensor section 38 outputs data indicative of the latitude and the longitude of the tracker 12 to the processor 30 at a predetermined sampling rate. The depth sensor included in the sensor section 38 is a depth sensor that utilizes Time of Flight (ToF), patterned stereo, or structured light technology, for example. The depth sensor outputs, to the processor 30, data indicative of the distance from the tracker 12, at a predetermined sampling rate. The sensor section 38 may further include other sensors such as a radio frequency (RF) sensor, an ultrasonic sensor, and an event-driven sensor.

The tracker 12 of the present embodiment may include an input/output port such as a High-Definition Multimedia Interface (HDMI) (registered trademark) port, a universal serial bus (USB) port, or an auxiliary (AUX) port, as well as headphones and speakers.

In the present embodiment, SLAM processing including self-position estimation and environmental map generation is carried out on the basis of sensing data acquired by the tracker 12. The self-position estimation involves estimating at least either the position or the direction of the tracker 12, for example. Here, a global position and a global direction of the tracker 12 may be estimated. The environmental maps thus generated are used in diverse processes including virtual reality (VR) display and augmented reality (AR) display.

The present embodiment improves the utility value of the environmental map, as will be explained below.

Also, in the present embodiment, the SLAM processing generates environment data based on the sensing data acquired by the tracker 12. In the present embodiment, the environment data is data that is generated on the basis of the sensing data through the SLAM processing and that is indicative of objects such as point clouds, three-dimensional (3D) meshes, and textures, for example. The environment data thus generated is accumulated in the server 10 as a portion of the life log. In the present embodiment, the environmental map at a reproduction time point designated by the user is generated on the basis of the environment data accumulated in the server 10. The environmental map thus generated is displayed on the display section 36 of the tracker 12.

If the server 10 were to store chronologically the environmental maps at diverse time points in order to cause the environmental map at the designated reproduction time point to be displayed, a massive amount of storage would be required to store these environmental maps.

In view of the above, the present embodiment makes it possible to save the memory capacity needed to store the chronologically managed environmental maps, as will be descried below.

Explained below in more detail are the functions of the server 10 and the tracker 12 of the present embodiment as well as the processes performed by the server 10.

Figure 3:
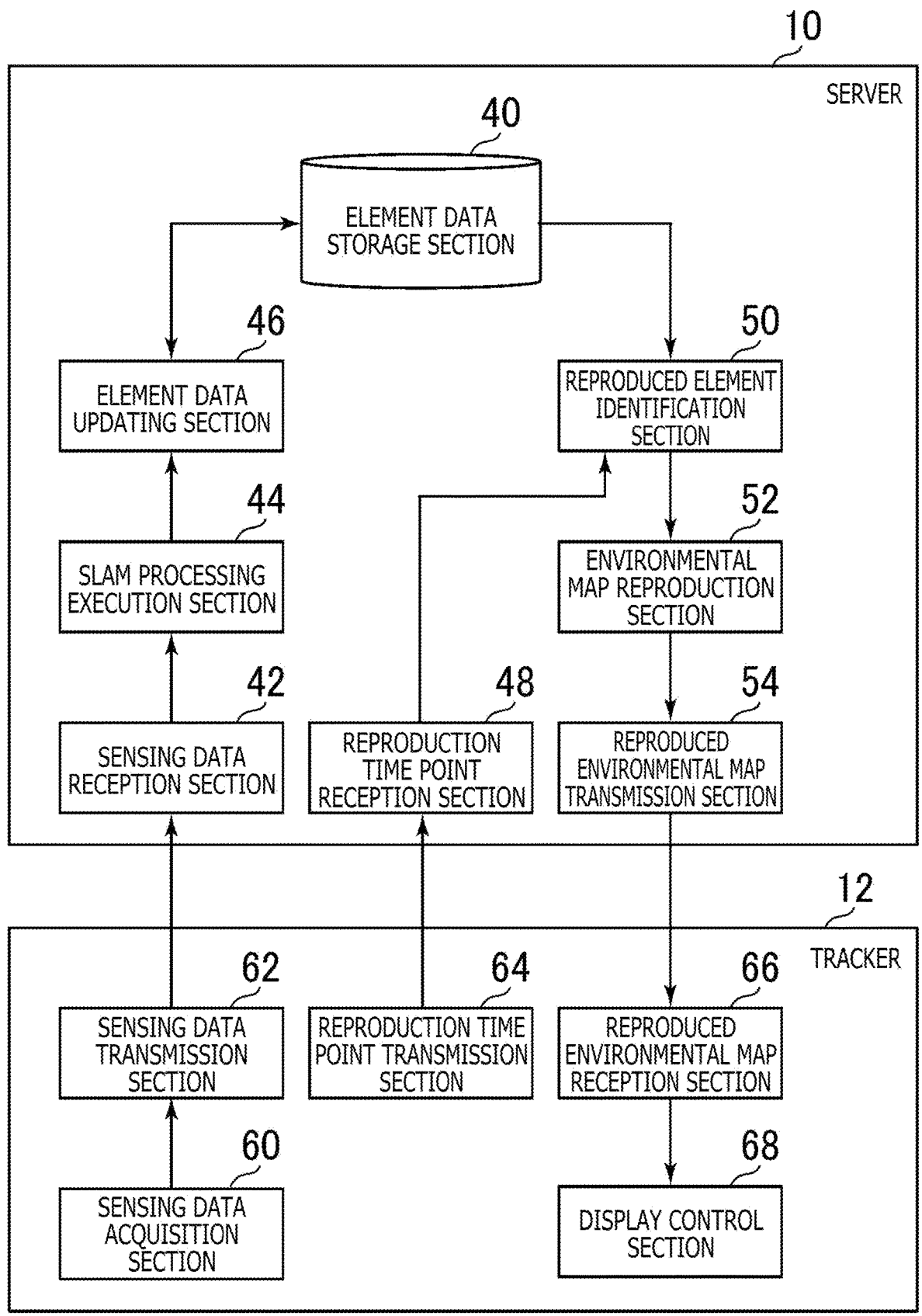
FIG. 3 is a functional block diagram depicting examples of functions implemented by the environmental map management system according to one embodiment of the present invention.

FIG. 3 is a functional block diagram depicting examples of functions implemented by the server 10 and the tracker 12 of the present embodiment. It is to be noted that the server 10 and the tracker 12 of the present embodiment need not implement all functions depicted in FIG. 3 and that functions other than those in FIG. 3 may also be implemented.

As depicted in FIG. 3, the server 10 functionally includes, for example, an element data storage section 40, a sensing data reception section 42, a SLAM processing execution section 44, an element data updating section 46, a reproduction time point reception section 48, a reproduced element identification section 50, an environmental map reproduction section 52, and a reproduced environmental map transmission section 54. The element data storage section 40 is implemented using mainly the storage section 22. The sensing data reception section 42, the reproduction time point reception section 48, and the reproduced environmental map transmission section 54 are implemented using mainly the communication section 24. The SLAM processing execution section 44, the element data updating section 46, the reproduced element identification section 50, and the environmental map reproduction section 52 are implemented using mainly the processor 20.

The above functions may alternatively be implemented by the processor 20 executing programs that include the commands corresponding to these functions, the programs being installed in the server 10 acting as a computer. The programs may be supplied to the server 10 by means of a computer-readable information storage medium such as an optical disk, a magnetic disk, a magnetic tape, a magneto-optical disk, or a flash memory, or by way of the Internet, for example.

Also as depicted in FIG. 3, the tracker 12 functionally includes a sensing data acquisition section 60, a sensing data transmission section 62, a reproduction time point transmission section 64, a reproduced environmental map reception section 66, and a display control section 68. The sensing data acquisition section 60 is implemented using mainly the processor 30 and the sensor section 38. The sensing data transmission section 62, the reproduction time point transmission section 64, and the reproduced environmental map reception section 66 are implemented using mainly the communication section 34. The display control section 68 is implemented using mainly the processor 30 and the display section 36.

The above functions may alternatively be implemented by the processor 30 executing programs that include the commands corresponding to these functions, the programs being installed in the tracker 12 acting as a computer. The programs may be supplied to the tracker 12 by means of a computer-readable information storage medium such as an optical disk, a magnetic disk, a magnetic tape, a magneto-optical disk, or a flash memory, or by way of the Internet, for example.

In the present embodiment, for example, the element data storage section 40 stores at least one piece of element data. The element data according to the present embodiment includes environment data and sensing time point data.

In the present embodiment, the environment data is, for example, data that is generated by the SLAM processing on the basis of the sensing data and that is indicative of objects such as point clouds, 3D meshes, and textures, as described above.

In the present embodiment, the sensing time point data is, for example, data associated with the time points at which such elements as objects or their parts represented by the environment data were sensed. The expression form in which the time points are expressed by the sensing time point data is not limited to anything specific. For example, the sensing time point data may be expressed in the form of years, months, and days; date and time; time of day; or timestamps.

Figure 4:
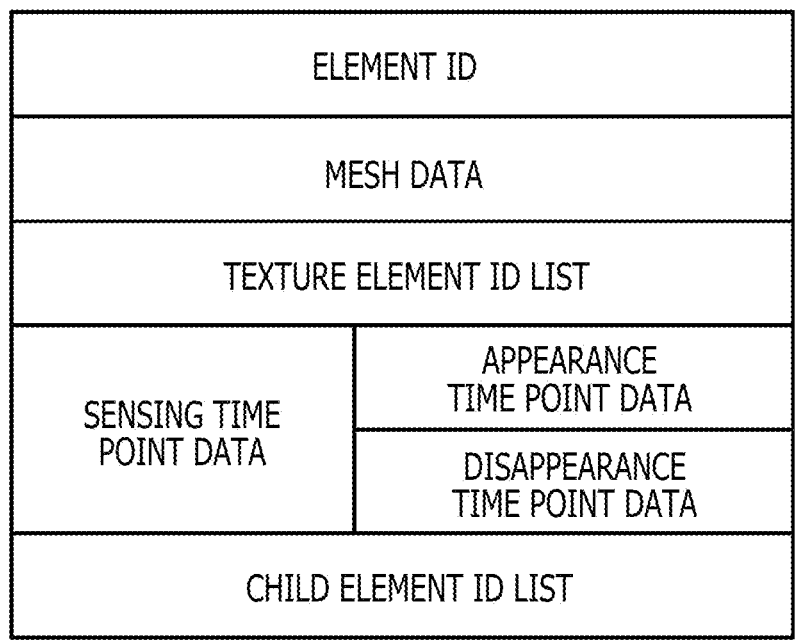
FIG. 4 is a diagram depicting an example of the data structure of mesh element data.

FIG. 4 is a diagram depicting an example of the data structure of mesh element data that is an example of the element data according to the present embodiment. The mesh element data is data associated with a mesh such as a 3D mesh. The mesh element data depicted in FIG. 4 includes an element identification (ID), mesh data, a texture element ID list, sensing time point data, and a child element ID list.

The element ID included in given mesh element data is identification information identifying the mesh element data.

The mesh data included in the mesh element data is an example of the above-mentioned environment data. The mesh data indicates a mesh such as a 3D mesh and the position and the direction in which the mesh is arranged.

The texture element ID list included in given mesh element data is set with the element ID of the texture element data associated with the mesh element data. That is, the texture element ID list provides a link to the texture element data associated with the mesh element data. The texture element ID list may also be set with multiple element IDs.

The sensing time point data included in the mesh element data includes appearance time point data and disappearance time point data.

The appearance time point data included in given mesh element data is, in the present embodiment, for example, data indicative of the time point at which the element represented by the mesh indicated by the mesh data included in the mesh element data was sensed for the first time.

The disappearance time point data included in given mesh element data is, in the present embodiment, for example, data indicative of the time point at which the element represented by the mesh indicated by the mesh data included in the mesh element data was confirmed to have disappeared in real space, on the basis of the sensing data. The disappearance time point data is, for example, data indicative of the time point at which the element represented by the mesh was confirmed to have disappeared in real space, on the basis of the latest sensing data.

As described above, the sensing time point data according to the present embodiment may be data associated with a time range in which the element represented by the environment data is estimated to be present in real space on the basis of the time point at which the element was sensed. In the present embodiment, for example, the time range ranging from the time point indicated by the appearance time point data included in the mesh element data to the time point indicated by the disappearance time point data corresponds to the time range in which the element represented by the element data is estimated to be present in real space.

It is to be noted that, in the present embodiment, at least either the appearance time point data or the disappearance time point data may not be set with a value. For example, that the disappearance time point data included in given element data is not set corresponds to a state where the end of the time range in which the element represented by the element data is estimated to be present in real space is not set. As another example, that the appearance time point data included in given element data is not set corresponds to a state where the beginning of the time range in which the element represented by the element data is estimated to be present in real space is not set.

The child element ID list included in given mesh element data is set with the element ID of another piece of mesh element data associated with the mesh element data as a child element thereof. The child element ID list may be set with multiple element IDs.

Figure 5:
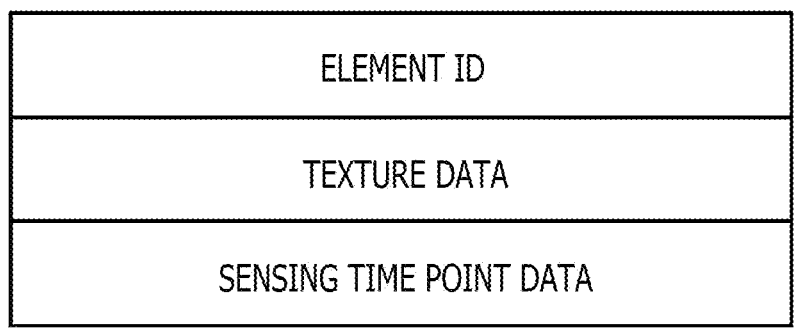
FIG. 5 is a diagram depicting an example of the data structure of texture element data.

FIG. 5 is a diagram depicting an example of the data structure of texture element data that is another example of the element data according to the present embodiment. The texture element data is data associated with the texture pasted on a 3D mesh, for example. The mesh element data depicted in FIG. 5 includes an element ID, texture data, and sensing time point data.

The element ID included in the texture element data is identification information identifying the texture element data.

The texture data included in the texture element data is data indicative of the texture pasted on the mesh such as a 3D mesh.

In the present embodiment, the sensing time point data is, for example, data indicative of the time point at which the texture indicated by the texture data included in the texture element data was sensed.

Figure 6:
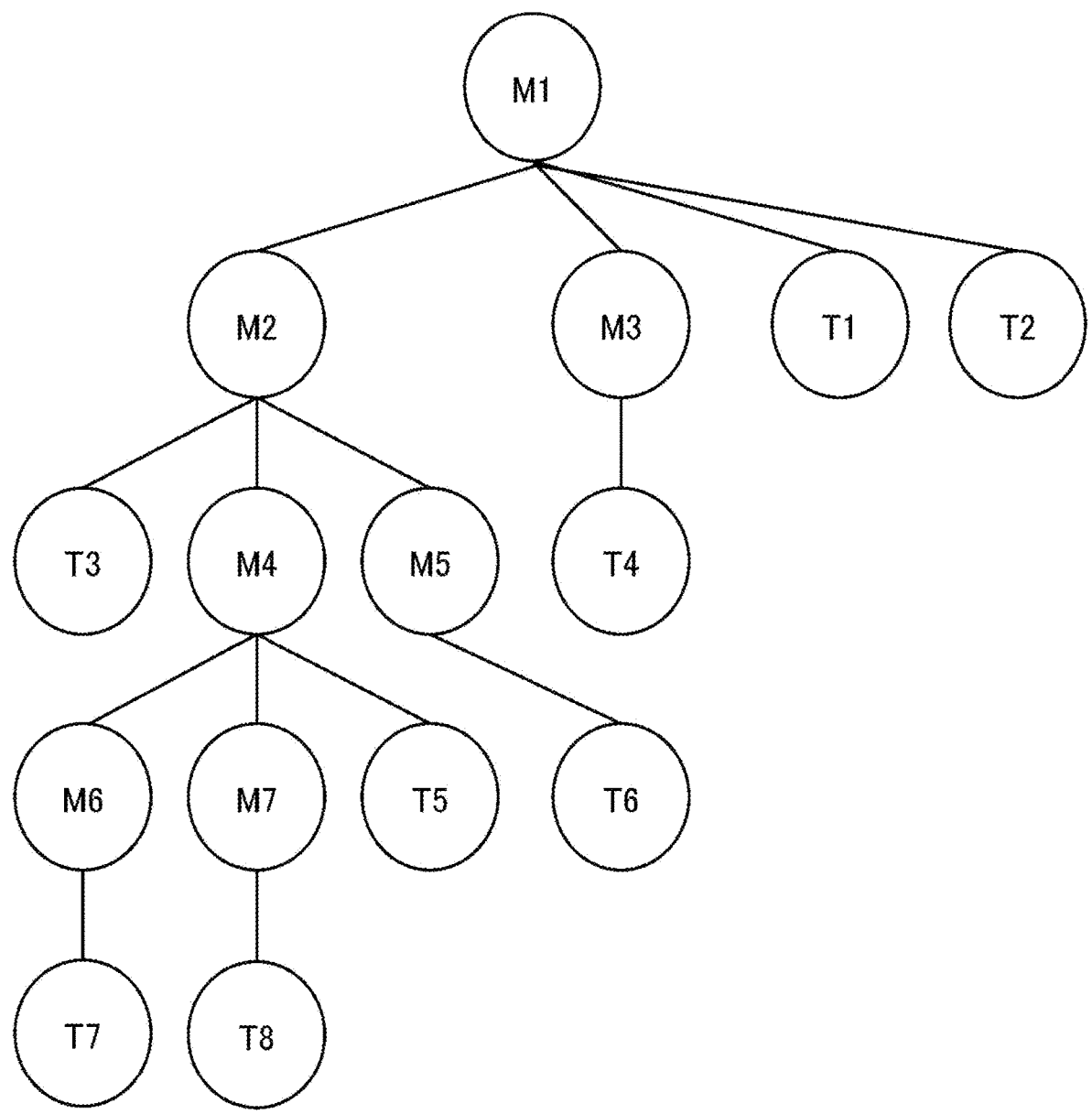
FIG. 6 is a diagram schematically depicting an example of relations between pieces of element data.

FIG. 6 is a diagram schematically depicting an example of relations between the pieces of element data according to the present embodiment.

Elements M1 through M7 depicted in FIG. 6 correspond to mesh element data. Elements T1 through T8 depicted in FIG. 6 correspond to texture element data. In the description that follows, the element data having no associated parent element, i.e., the element data of which the element ID is not set in the child element ID list of any element data stored in the element data storage section 40, is referred to as root element data. In the example of FIG. 6, the element M1 is the root element data.

The elements M2 and M3 are the child elements of the element M1. The element M1 is associated with two pieces of texture element data (elements T1 and T2). The elements M4 and M5 are the child elements of the element M2. The element M2 is associated with one piece of texture element data (element T3). The element M3 is associated with one piece of texture element data (element T4). The elements M6 and M7 are the child elements of the element M4. The element M4 is associated with one piece of texture element data (element T5). The element M5 is associated with one piece of texture element data (element T6). The element M6 is associated with one piece of texture element data (element T7). The element M7 is associated with one piece of texture element data (element T8).

With the present embodiment, as described above, multiple pieces of element data are managed in a manner associated with each other in a network structure (e.g., tree structure in this case). In this network structure, the longer the time range of any one of the multiple pieces of element data associated with the sensing time point data included in the element data, the closer that piece of element data is arranged to the root side; the shorter the time range of a given piece of element data, the closer that piece of element data is arranged to the leaf side.

In the present embodiment, for example, the sensing data acquisition section 60 acquires the sensing data generated by the sensor section 38 of the tracker 12.

The sensing data acquired by the sensing data acquisition section 60 may include images captured by the camera included in the sensor section 38 of the tracker 12, for example. The sensing data acquired by the tracker 12 may further include depth data measured by the camera and the depth sensor included in the sensor section 38 of the tracker 12.

The sensing data acquired by the tracker 12 may also include data indicative of the direction of the tracker 12, the data being measured by the geomagnetic sensor included in the sensor section 38 of the tracker 12. The sensing data acquired by the tracker 12 may further include data indicative of the acceleration, the amount of rotation, and the amount of displacement of the tracker 12, the data being measured by the inertial sensor included in the sensor section 38.

The sensing data acquired by the tracker 12 may also include data indicative of the latitude and the longitude of the tracker 12, the data being measured by the GPS module included in the sensor section 38. The sensing data acquired by the tracker 12 may further include feature point groups (key frames).

In the present embodiment, for example, the sensing data transmission section 62 transmits the sensing data acquired by the sensing data acquisition section 60 to the server 10. With the present embodiment, what is transmitted is the sensing data associated with the sensing time point data indicative of the time points at which sensing was performed by the tracker 12, for example.

In the present embodiment, for example, the acquisition and transmission of the sensing data are performed repeatedly by the tracker 12.

In the present embodiment, for example, the sensing data reception section 42 receives the sensing data transmitted from the tracker 12.

In the present embodiment, for example, the SLAM processing execution section 44 executes SLAM processing including estimation of the position or the direction of the tracker 12 on the basis of the sensing data received by the sensing data reception section 42. Here, a global position and a global direction of the tracker 12 may be estimated. Here, the SLAM processing execution section 44 may execute the SLAM processing including processes of relocalization, loop closing, 3D meshing, and object recognition, for example.

The above SLAM processing may also include processes of plane detection and 3D mesh segmentation. The processes of plane detection and 3D mesh segmentation involve detecting a continuous plane such as the ground and walls and segmenting the detected plane as a whole 3D mesh into individual 3D meshes such as ground, buildings, and trees. The SLAM processing may further include a process of 3D mesh optimization. The 3D mesh optimization process involves deleting, from the 3D meshes, parts estimated to be mobile objects and noise-induced contamination, reducing the number of polygons, and smoothing out the mesh surface. The SLAM processing may further include a process of texture generation. The texture generation process involves generating a texture image with respect to the 3D mesh on the basis of mesh vertex colors.

As another example, the SLAM processing execution section 44 may store the sensing data received by the sensing data reception section 42. The SLAM processing execution section 44 may then execute the SLAM processing with use of the chronologically stored sensing data.

The above SLAM processing executed by the SLAM processing execution section 44 generates environment data such as mesh data and texture data.

In executing the SLAM processing, the SLAM processing execution section 44 may access the element data stored in the element data storage section 40 and the environmental map generated on the basis of the stored element data.

In the description that follows, the environment data based on new sensing data (i.e., sensing data most recently received by the server 10) is referred to as latest environment data.

In the present embodiment, for example, the element data updating section 46 generates the latest environmental map on the basis of the multiple pieces of element data stored in the element data storage section 40. The element data updating section 46 then identifies differences between a portion of the latest environmental map and the latest environment data.

For example, the element data updating section 46 identifies the differences between a portion of the latest environmental map corresponding to the position of the element in real space as represented by the latest environment data on one hand and the latest environment data on the other hand.

The element data updating section 46 then generates additional environment data that is a portion or all of the latest environment data and that represents an element not appearing in the latest environmental map based on the multiple pieces of element data stored in the element data storage section 40.

Here, from the latest environment data, the element data updating section 46 identifies a portion that represents the element not appearing in the latest environmental map, for example. In a case where the element represented by the latest environment data does not appear in the latest environmental map at all, the entirety of the latest environment data is identified here. The element data updating section 46 then generates additional environment data representing a portion or all of the environment data thus identified. There are two kinds of additional environment data, that is, additional mesh data indicating a mesh and additional texture data indicative of a texture.

The element data updating section 46 proceeds to generate new element data that includes the additional environment data thus generated. In the description that follows, the new element data including the additional environment data is referred to as additional element data. The new element data including the additional mesh data is referred to as additional mesh element data. The new element data including the additional texture data is referred to as additional texture element data.

The element data updating section 46 then stores the additional element data into the element data storage section 40.

The element ID of the additional mesh element data is set with newly assigned identification information. The mesh data included in the additional mesh element data is set with the additional mesh data. The texture element ID list included in the additional mesh element data is set with the texture element ID of the texture data (e.g., additional texture data) indicative of the texture of the element represented by the additional mesh data. The value of the appearance time point data included in the additional mesh element data is set with the value of the sensing time point data associated with the latest sensing data.

Also, in the present embodiment, the element data updating section 46 identifies the mesh element data associated with the additional mesh data. For example, the element data updating section 46 identifies the mesh element data of a mesh adjacent to the mesh indicated by the additional mesh data. The element data updating section 46 then adds the element ID of the additional mesh element data to the child element ID list of the identified mesh element data. Then the additional mesh element data is registered as a child element of the identified mesh element data. In such a manner, the element data updating section 46 associates the additional mesh element data with the identified mesh element data.

The element ID of the additional texture element data is set with newly assigned identification information. The texture data included in the additional texture element data is set with additional texture data. The value of the sensing time point data included in the additional texture element data is set with the value of the sensing time point data associated with the latest sensing data.

Here, the element data updating section 46 may identify a mesh on which the texture indicated by the additional texture data is to be pasted. The element ID of the additional texture data may then be added to the texture element ID list of the mesh data indicative of the identified mesh.

In the latest environmental map, the element data updating section 46 identifies a disappearing element that appears in the environmental map but does not appear in the latest environment data. The element data updating section 46 then generates disappearing environment data representing the disappearing element thus identified. There are two kinds of disappearing environment data, that is, disappearing mesh data indicating a mesh and disappearing texture data indicative of a texture.

In the present embodiment, for example, the element data updating section 46 deletes the disappearing element from the element data in which the disappearing element partially appears. A portion of the mesh data is deleted here, for example.

The element data updating section 46 then generates new element data that includes the disappearing environment data and the sensing time point data associated with the time range in which the disappearing element is estimated to be present in real space on the basis of the time point at which the disappearing element was sensed. In the description that follows, the new element data including the disappearing environment data is referred to as disappearing element data. The new element data including the disappearing mesh data is referred to as disappearing mesh element data. The new element data including the disappearing texture data is referred to as disappearing texture element data.

The element data updating section 46 then stores the disappearing element data into the element data storage section 40.

The element ID of the disappearing mesh element data is set with newly assigned identification information. The mesh data included in the disappearing mesh element data is set with the disappearing mesh data. The texture element ID list included in given disappearing mesh element data is set with the texture element ID of the texture data indicative of the texture of the element represented by the disappearing mesh data. The value of the appearance time point data included in the disappearing mesh element data is set with the value of the appearance time point data of the mesh element data of which the portion corresponding to the disappearing element was deleted. As will be discussed later, the mesh element data of which the portion corresponding to the disappearing element was deleted is set as a parent element of the disappearing mesh element data. The value of the appearance time point data included in the disappearing mesh element data is thus set with the value of the appearance time point data of the mesh element data that is the parent element of the disappearing mesh element data. The value of the disappearance time point data included in the disappearing mesh element data is set with the value of the sensing time point data associated with the latest sensing data.

Also, in the present embodiment, the element data updating section 46 identifies the mesh element data associated with the disappearing mesh data. For example, the element data updating section 46 identifies the mesh element data of which the portion corresponding to the disappearing element was deleted. The element ID of the disappearing mesh element data is then added to the child element ID list of the identified mesh element data. In such a manner, the disappearing mesh element data is registered as a child element of the identified mesh element data.

The element ID of the disappearing texture element data is set with newly assigned identification information. The texture data included in the disappearing texture element data is set with the disappearing texture data. The value of the sensing time point data included in the disappearing texture element data is set with the value of the sensing time point data associated with the latest sensing data.

Here, the element data updating section 46 may identify a mesh on which the texture indicated by given disappearing texture data is to be pasted. The element data updating section 46 may further add the element ID of the disappearing texture data to the texture element ID list of the mesh data indicative of the identified mesh.

Here, of the element data stored in the element data storage section 40, there may be some of which the element represented by the environment data included therein may match the disappearing element. In this case, the disappearing element is not deleted from the above-mentioned element data in which the disappearing element partially appears. Instead, the element data updating section 46 sets the value of the sensing time point data associated with the latest sensing data to the value of the disappearance time point data included in the element data.

In the present embodiment, generation and registration of the element data are carried out as described above. Thus, the time range associated with the sensing time point data included in given element data includes the time range associated with the sensing time point data included in the element data referenced by a link included in the element data. For example, the time range associated with the sensing time point data included in given mesh element data includes the time range associated with the sensing time point data included in the mesh element data that is a child element of the mesh element data.

In the present embodiment, for example, in response to user's operations to designate a reproduction time point, the reproduction time point transmission section 64 generates the reproduction time point data indicative of the designated reproduction time point and transmits the generated reproduction time point data to the server 10. The expression form in which the time point of the reproduction time point data is expressed is not limited to anything specific. For example, the time point may be expressed in the form of years, months, and days; date and time; time of day; or timestamps.

In the present embodiment, for example, the reproduction time point reception section 48 receives designation of the reproduction time point at which the environmental map is to be reproduced. For example, the reproduction time point reception section 48 receives the reproduction time point data transmitted from the tracker 12.

In the present embodiment, for example, from the multiple pieces of element data stored in the element data storage section 40, the reproduced element identification section 50 identifies more than one piece of element data that includes the sensing time point data associated with the time range including the reproduction time point. In the description that follows, the element data including the sensing time point data associated with the time range including the reproduction time point is referred to as reproduced element data.

Here, that the reproduction time point is included in the period between the time point indicated by the appearance time point data included in given mesh element data on one hand and the time point indicated by the disappearance time point data on the other hand is the condition of the mesh element data of interest being the reproduced element data, for example. The mesh element data meeting the above condition is identified as the reproduced element data. Here, given the mesh element data for which the value of the disappearance time point data is not set, the data whose time point indicated by the appearance time point precedes the reproduction time point is identified as the reproduced element data. Given the mesh element data for which the value of the appearance time point data is not set, the data whose time point indicated by the disappearance time point data is subsequent to the reproduction time point is identified as the reproduced element data.

Also identified is the texture element data of which the time point indicated by the sensing time point data matches the reproduction time point. Here, the texture element data of which the time point indicated by the sensing time point data is closest to the reproduction time point may be identified. Alternatively, of the texture element data of which the time point indicated by the sensing time point data precedes the reproduction time point, the texture element data whose time point indicated by the sensing time point data is closest to the reproduction time point may be identified.

In the present embodiment, for example, the environmental map reproduction section 52 generates the environmental map at the reproduction time point by combining the environment data included in each of the pieces of reproduced element data identified by the reproduced element identification section 50. What is generated here is the environmental map at the time point indicated by the reproduction time point data received from the tracker 12, for example. In the description that follows, the environmental map thus generated is referred to as reproduced environmental map.

In the present embodiment, for example, the reproduced environmental map transmission section 54 transmits, to the tracker 12, the reproduced environmental map generated by the environmental map reproduction section 52. What is transmitted here may be an image depicting how things look like when viewed from the position in the environmental map corresponding to the position of the tracker 12, in the direction in the environmental map corresponding to the direction of the tracker 12, for example.

In the present embodiment, for example, the reproduced environmental map reception section 66 receives data such as the reproduced environmental map transmitted from the reproduced environmental map transmission section 54.

In the present embodiment, for example, the display control section 68 performs various processes including VR display and AR display using data such as the reproduced environmental map received by the reproduced environmental map reception section 66.

Figure 7A:
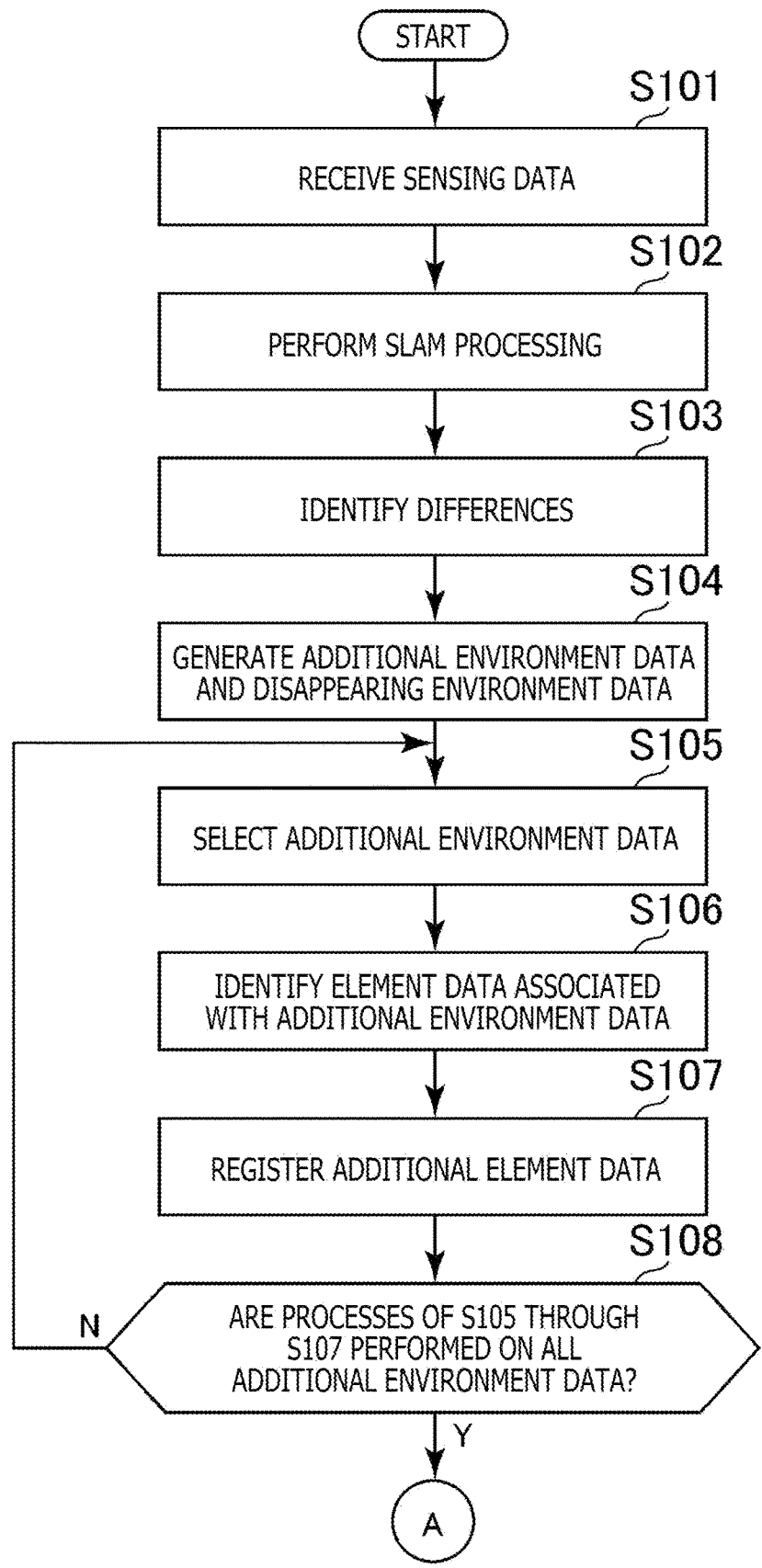
FIG. 7A is a flowchart depicting an example of the flow of processing performed by the server according to one embodiment of the present invention.
Figure 7B:
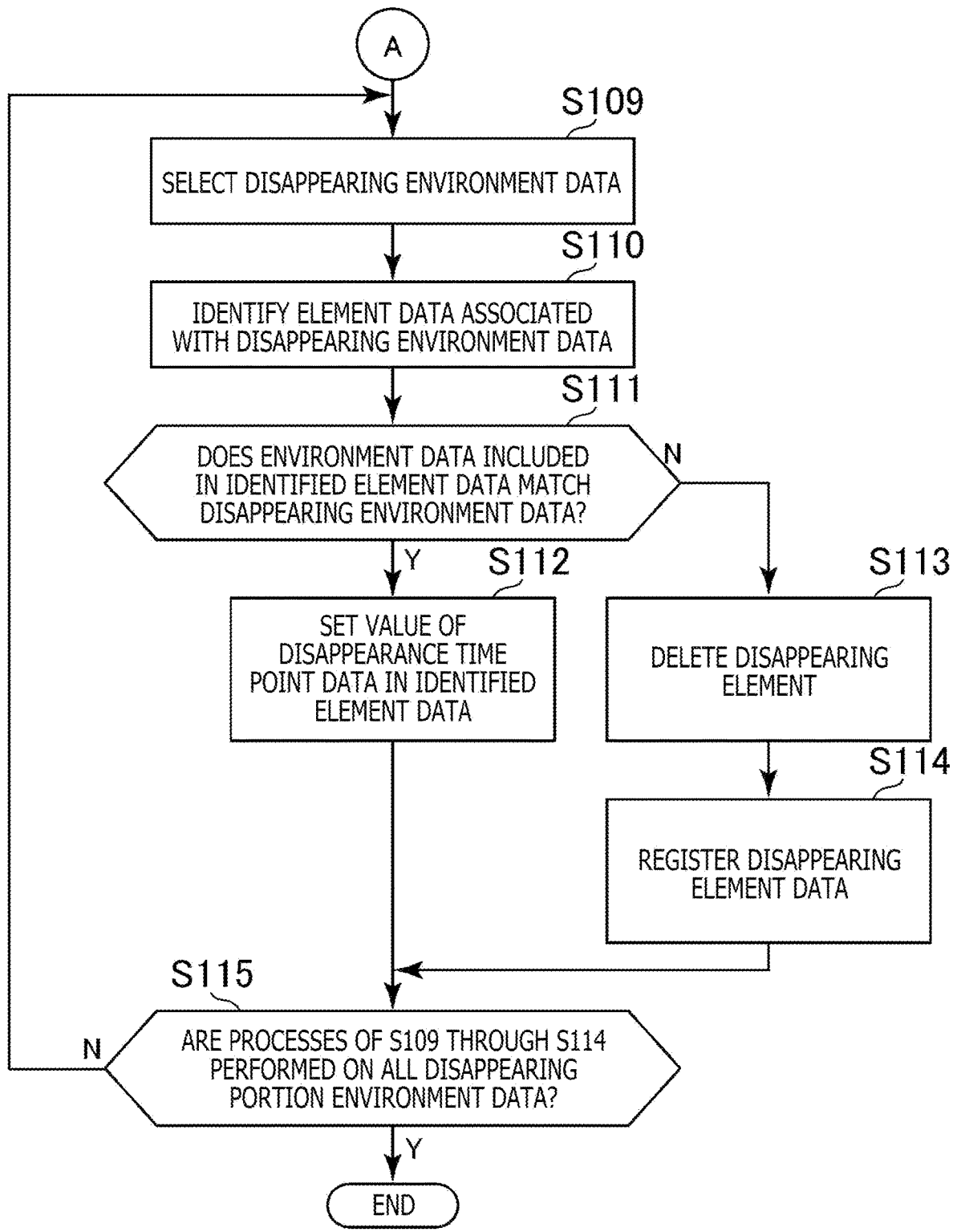
FIG. 7B is a flowchart depicting another example of the flow of the processing performed by the server according to one embodiment of the present invention.

Explained below with reference to the flowcharts in FIGS. 7A and 7B is an example of the flow of element data update processing performed by the server 10 of the present embodiment.

First, the sensing data reception section 42 receives the latest sensing data (S101).

The SLAM processing execution section 44 then executes SLAM processing (S102) based on the sensing data received in the process of S101. Executing the process of S102 generates the latest environment data.

The element data updating section 46 then identifies differences between the latest environment data generated in the process of S102 on one hand and a portion of the latest environmental map generated on the basis of the multiple pieces of element data stored in the element data storage section 40 on the other hand (S103). In the process of S103, the element data updating section 46 may generate the latest environmental map by combining multiple pieces of element data, before identifying the differences between a portion of the generated environmental map and the latest environment data.

On the basis of the result of the identification in the process of S103, the element data updating section 46 generates additional environment data and disappearing environment data (S104).

From the additional environment data generated in the process of S104, the element data updating section 46 selects one piece of data on which the processes of S106 and S107 are not performed yet (S105).

The element data updating section 46 then identifies the element data associated with the additional environment data selected in the process of S105 (S106).

The element data updating section 46 proceeds to generate additional element data including the additional environment data selected in the process of S105 and registers the generated additional element data as an element associated with the element data identified in the process of S106 (S107). Here, the additional mesh element data is registered as a child element of the element data identified in the process of S106.

The element data updating section 46 then confirms whether or not the processes of S105 through S107 are performed on all additional environment data generated in the process of S104 (S108).

In a case where it is confirmed that the processes of S105 through S107 have not been performed on all additional environment data generated in the process of S104 (S108: N), the process returns to the process of S105.

Suppose that the processes of S105 through S107 are confirmed to have been performed on all additional environment data generated in the process of S104 (S108: Y). In this case, from the pieces of disappearing environment data generated in the process of S104, the element data updating section 46 selects one piece of data not having undergone the processes of S110 through S114 (S109).

The element data updating section 46 then identifies the element data associated with the disappearing environment data selected in the process of S109 (S110).

The element data updating section 46 determines whether or not the environment data included in the element data identified in the process of S110 matches the disappearing environment data selected in the process of S109 (S111).

In the case of a match (S111: Y), the value of the disappearance time point data in the element data identified in the process of S110 is set with the value of the sensing time point data associated with the latest sensing data received in the process of S101 (S112).

In the case of a mismatch (S111: N), the disappearing element corresponding to the disappearing environment data selected in the process of S109 is deleted from the element data identified in the process of S110 (S113).

The element data updating section 46 then generates disappearing element data including the disappearing environment data selected in the process of S109 and registers the generated disappearing element data as an element associated with the element data identified in the process of S110 (S114). Here, the disappearing mesh element data is registered as a child element of the element data identified in the process of S110.

The element data updating section 46 then confirms whether or not the processes of S109 through S114 are performed on all disappearing environment data generated in the process of S104 (S115).

In a case where it is confirmed that the processes of S109 through S114 are not performed on all disappearing environment data generated in the process of S104 (S115: N), the process returns to the process of S109.

In a case where it is confirmed that the processes of S109 through S114 have been performed on all disappearing environment data generated in the process of S104 (S115: Y), the processing of this example is terminated.

Figure 8:
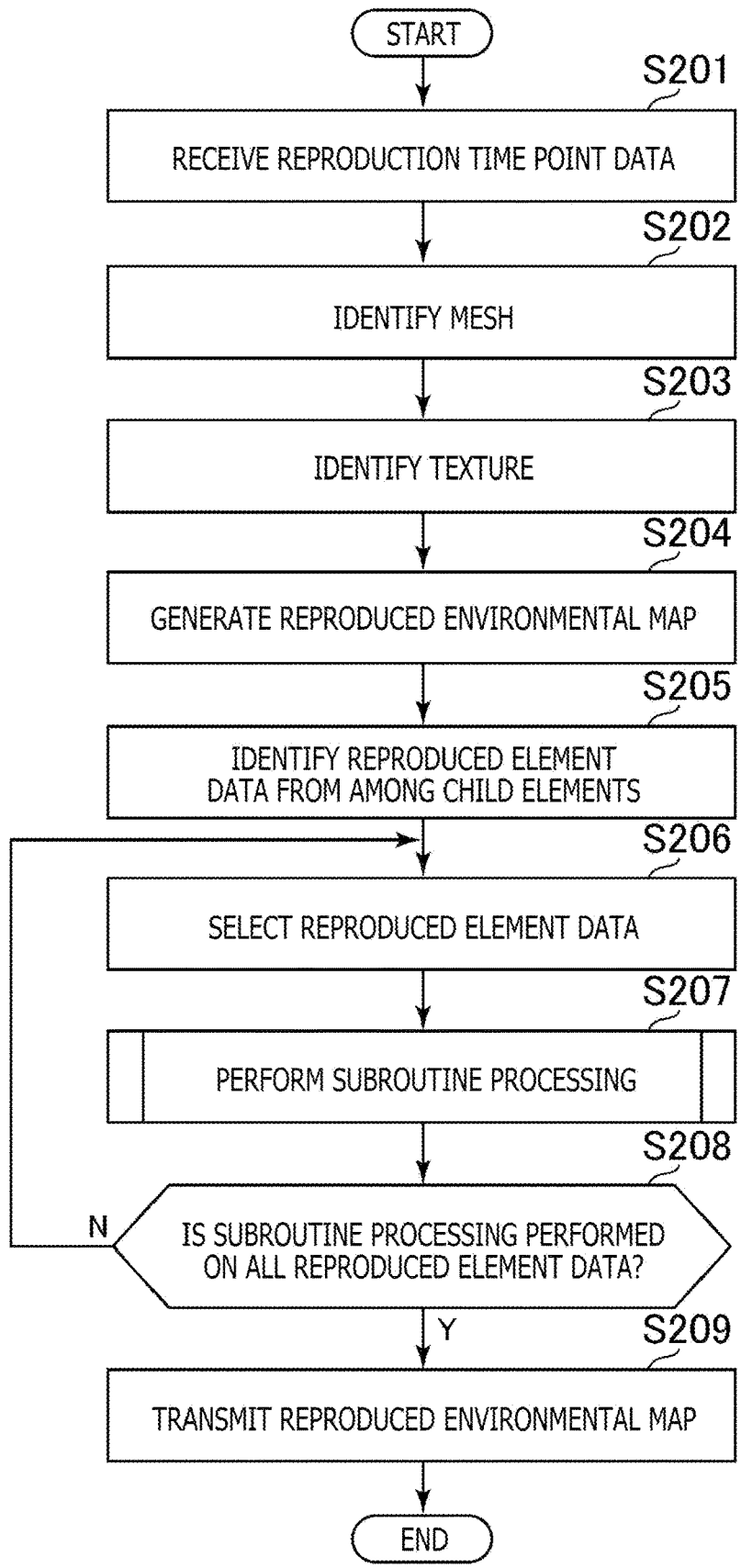
FIG. 8 is a flowchart depicting still another example of the flow of the processing performed by the server according to one embodiment of the present invention.

Explained next with reference to the flowchart in FIG. 8 is an example of the flow of processing performed by the server 10 of the present embodiment for transmitting the reproduced environmental map.

First, the reproduction time point reception section 48 receives the reproduction time point data transmitted from the tracker 12 (S201).

The reproduced element identification section 50 then identifies the mesh indicated by the mesh data included in the root element data (S202).

The reproduced element identification section 50 then identifies the texture element data referenced by the texture element ID list included in the root element data and identifies the texture indicated by the texture data included in the identified texture element data (S203). Here, in a case where multiple element IDs are set in the texture element ID list included in the root element data, one piece of the texture element data corresponding to each of these multiple element IDs is selected on the basis of the reproduction time point indicated by the reproduction time point data. The texture indicated by the texture data included in the selected texture element data is then identified.

Then, the environmental map reproduction section 52 generates the reproduced environmental map that is an environmental map formed by pasting the texture identified in the process of S203 on the mesh identified in the process of S202 (S204).

The reproduced element identification section 50 then identifies the reproduced element data from among the pieces of mesh element data constituting child elements of the root element data (S205).

From the pieces of reproduced element data identified in the process of S205, the reproduced element identification section 50 selects one piece of data not having undergone subroutine processing to be discussed below with reference to FIG. 9 (S206).

Figure 9:
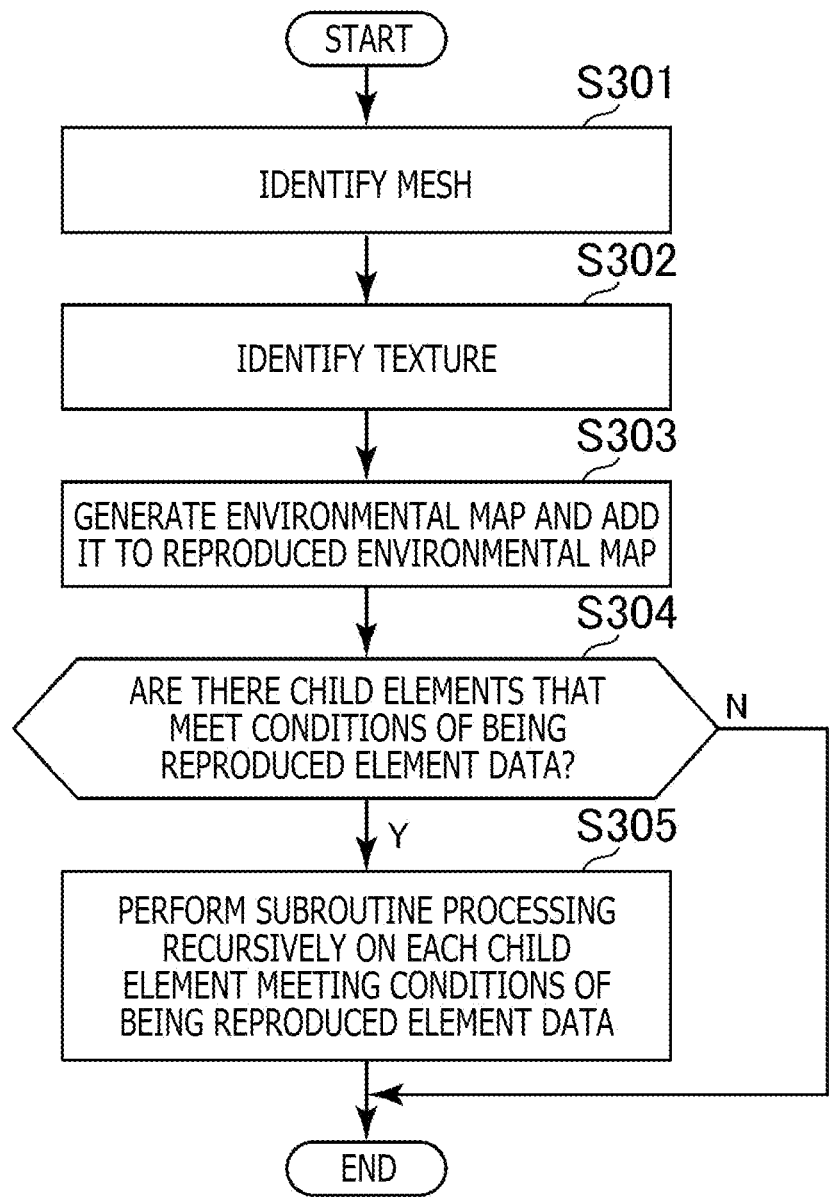
FIG. 9 is a flowchart depicting yet another example of the flow of the processing performed by the server according to one embodiment of the present invention.

The reproduced element identification section 50 and the environmental map reproduction section 52 proceed to perform the subroutine processing (S207) depicted in FIG. 9, using as the argument the reproduced element data selected in the process of S206.

The reproduced element identification section 50 then confirms whether or not the subroutine processing depicted in FIG. 9 is performed on all reproduced element data identified in the process of S205 (S208).

In a case where it is confirmed that the subroutine processing depicted in FIG. 9 has not been performed on all reproduced element data identified in the process of S205 (S208: N), the process returns to the process of S206.

Suppose that the subroutine processing depicted in FIG. 9 is confirmed to have been performed on all reproduced element data identified in the process of S205 (S208: Y). In this case, the reproduced environmental map transmission section 54 transmits the reproduced environmental map to the tracker 12 (S209) and terminates the processing of this example.

Explained below with reference to the flowchart in FIG. 9 is an example of the flow of the subroutine processing using the reproduced element data as the argument.

First, the reproduced element identification section 50 identifies the mesh indicated by the mesh data included in the reproduced element data (S301).

The reproduced element identification section 50 then identifies the texture element data referenced by the texture element ID list included in the reproduced element data and identifies the texture indicated by the texture data included in the identified texture element data (S302). Here, in a case where multiple element IDs are set in the texture element ID list included in the reproduced element data, one piece of the texture element data corresponding to each of the multiple element IDs is selected on the basis of the reproduction time point indicated by the reproduction time point data. The texture indicated by the texture data included in the selected texture element data is then identified.

The environmental map reproduction section 52 then generates the environmental map formed by pasting the texture identified in the process of S302 on the mesh identified in the process of S301 and adds the generated environmental map to the reproduced environmental map (S303).

The reproduced element identification section 50 then confirms whether or not, from among the pieces of mesh element data as the child elements of the reproduced element data, there are any that meet the conditions of being the reproduced element data (S304).

In a case where there exists such data (S304: Y), the reproduced element identification section 50 and the environmental map reproduction section 52 perform the subroutine processing in FIG. 9 (S301 through S305) recursively on each of the child elements that meet the conditions of being the reproduced element data, the child element being used as the argument (S305).

In a case where there exists no such data (S304: N), the subroutine processing is terminated.

According to the present embodiment, the pieces of element data associated with multiple time points are associated with each other as described above. This improves the utility value of the environmental map.

Also, according to the present embodiment, as discussed above, less storage capacity is required to store the chronologically managed environmental map than if the environmental maps at diverse time points are stored on a time series basis.

In the above-described processing examples, the reproduced element identification section 50 performs recursively the process of identifying, from among the pieces of mesh element data as the child elements starting from the root element data, those that meet the conditions of being the reproduced element data.

In the present embodiment, the time range associated with the sensing time point data included in given element data includes the time range associated with the sensing time point data included in the child elements of the element data. Thus, in the case where given element data is confirmed not to meet the conditions of being the reproduced element data, the child elements of the element data are also determined not to meet the conditions of being the reproduced element data as well. That means these child elements of the element data need not be accessed. It is thus possible to generate the reproduced environmental map without accessing all element data stored in the element data storage section 40.

In the present embodiment, the sensing time point data included in the texture element data may indicate such time slots as "morning," "daytime," and "night." At the time the texture element data is registered, the sensing time point data may be set with the value corresponding to the time slot to which the time point indicated by the sensing time point data associated with the latest sensing data belongs. Then, the texture element ID list of the mesh element data may be arranged to relate multiple pieces of texture element data with one another that are associated with different time slots.

At the time the reproduced environmental map is generated, the environmental map reproduction section 52 may generate the environmental map formed by pasting, on the mesh, the texture indicated by the texture data associated to the sensing time point data associated with the time slot to which the reproduction time point belongs in the texture element data.

For example, in the process of S203, from the texture element data referenced by the texture element ID list included in the root element data, it is possible to select the texture element data including the sensing time point data associated with the time slot to which the reproduction time point belongs. Then, the texture indicated by the texture data included in the texture element data of interest may be identified. In the process of S204, the reproduced environmental map that is an environmental map formed by pasting the texture thus identified on the mesh identified in the process of S202 may be generated.

As another example, in the process of S302, from the texture element data referenced by the texture element ID list included in the root element data, the texture element data including the sensing time point data associated with the time slot to which the reproduction time point belongs may be selected. Then, the texture indicated by the texture data included in the texture element data of interest may be identified. Then, in the process of S303, the environmental map formed by pasting the texture thus identified on the mesh identified in the process of S301 may be added to the reproduced environmental map.

Also, in the present embodiment, the texture data may be replaced by vertex color data indicative of vertex colors. In this case, the environmental map reproduction section 52 may generate the environmental map of which the mesh indicated by given reproduced element data has its vertexes set with the color indicated by the vertex color data associated with the reproduced element data.

As another example, the element data indicative of the mesh may be associated with multiple pieces of vertex color data each associated with a different time slot. The environmental map reproduction section 52 may then generate the environmental map of which the mesh indicated by the reproduced element data has its vertexes set with the color indicated by the vertex color data associated with the time slot to which the reproduction time point belongs, the vertex color data being associated with the reproduced element data.

Also, in the present embodiment, in a case where there are similar textures in the same time slot from among such time slots as "morning," "daytime," and "night" that span days, a common texture may be used.

Also, the texture element data according to the present embodiment may be data associated with the time range in which the texture element data is estimated to be present in real space, as with the mesh element data.

Also, in the present embodiment, it is highly probable that marginal element data (i.e., of leaves), or the element data of which the number of links to the marginal element data is small and which is associated with a short time range in which the element data is estimated to be present in real space, represents a mobile object such as a person. Such element data may thus be deleted. For example, the marginal element data, or the element data of which the number of links to the element data is a predetermined number or less (e.g., three or less) and for which the time period ranging from the time point indicated by the appearance time point data to the time point indicated by the disappearance time point data is shorter than a predetermined time period, may be deleted.

Also, in the present embodiment, the environmental map reproduction section 52 may generate a four-dimensional environmental map dimensionally including a three-dimensional space and time, on the basis of the environment data corresponding to the sensing data acquired by the tracker. For example, the environmental map reproduction section 52 may generate a four-dimensional environmental map dimensionally including a three-dimensional space and time, on the basis of the multiple pieces of element data stored in the element data storage section 40. For instance, the environmental map reproduction section 52 may generate environmental maps at multiple reproduction time points, before generating a four-dimensional environmental map that includes the generated multiple environmental maps. The reproduction time point transmission section 64 may then transmit the generated four-dimensional environmental map to the tracker 12.

On the basis of the generated four-dimensional environmental map, the environmental map reproduction section 52 may generate the environmental map at the reproduction time point received by the reproduction time point reception section 48. The reproduction time point transmission section 64 may then transmit the generated environmental map to the tracker 12.

Also, in the present embodiment, in a case where there are few differences between the registered environment data and newly generated environment data, the newly generated environment data may not be registered. In this case, the registered environment data will be used in place of the newly generated environment data.

The present embodiment can be used in situations such as when travels or other events held at a designated date and time are to be re-experienced or where the memories at a designated date and time are to be relived, for example. For example, the element data storage section 40 may additionally store data indicative of the positions and visual line directions of the user's viewpoint on a time-series basis. An environmental map at a specific date and time may be generated, to display how things look like when the generated environmental map is viewed from the user's viewpoint in the user's visual line direction on a time-series basis at that date and time.

The present embodiment may also be used in a situation where the process of erecting a particular building is to be displayed in a fast-forward reproduction. For example, the environmental maps of the same place may be displayed successively over time.

It is to be noted that the present invention is not limited to the above embodiment.

The division of roles between the server 10 and the tracker 12 is not limited to what was discussed above. For example, part or all of the functions of the server 10 may be implemented by the tracker 12. For instance, the tracker 12 may generate the environment data based on the sensing data. The generated environment data may then be transmitted from the tracker 12 to the server 10.

The invention claimed is:

1. An element data management apparatus, comprising:
processing circuitry configured to:
 store, in a memory, at least one piece of element data that includes environment data generated on a basis of sensing data acquired by a tracker and that includes sensing time point data associated with a time range in which an element represented by the environment data is estimated to be present in real space on a basis of a time point at which the element was sensed, wherein the element data includes a link to other element data;
 identify, according to environment data generated on a basis of new sensing data, the element data associated with additional environment data constituting a portion or all of the generated environment data;
 associate the element data including the additional environment data with the identified element data; and
 delete marginal element data, wherein marginal element data corresponds to element data of which the number of links to the element data is a predetermined number or less and for which a time period ranging from a time point indicated by appearance time point data to a time point indicated by disappearance time point data is shorter than a predetermined time period.

2. The element data management apparatus according to claim 1, wherein the processing circuitry is further configured to:
 receive designation of a reproduction time point as a time point at which an environmental map is to be reproduced;
 identify, from a plurality of pieces of the element data stored in the memory, a plurality of pieces of reproduced element data including the sensing time point data associated with a time range including the reproduction time point; and
 generate an environmental map at the reproduction time point by combining the environment data included in each of the identified plurality of pieces of the reproduced element data.

3. The element data management apparatus according to claim 2, wherein
 the processing circuitry is further configured to:
 recursively execute a process of identifying, from among the other element data referenced by the link included in the element data, the element data including the sensing time point data associated with the time range including the reproduction time point, starting from the element data constituted by a given root element; and
 generate the environmental map at the reproduction time point by combining the environment data included in each of the plurality of pieces of the reproduced element data identified by the recursive execution of the process.

4. The element data management apparatus according to claim 3, wherein the time range associated with the sensing time point data included in the element data includes a time range associated with the sensing time point data included in the element data referenced by the link included in the element data.

5. The element data management apparatus according to claim 2, wherein a plurality of pieces of element data stored in the memory constitute a network structure such that the longer a time range of any one of the plurality of pieces of element data associated with the sensing time point data included in the element data, the closer that piece of element data is arranged to a root side and that the shorter the time range of a given piece of element data, the closer that piece of element data is arranged to a leaf side.

6. The element data management apparatus according to claim 1, wherein the processing circuitry is further configured to
 generate a four-dimensional environmental map dimensionally including a three-dimensional space and time based on the stored element data.

7. An element data management method, comprising:
 given at least one piece of element data including environment data generated on a basis of sensing data acquired by a tracker and including sensing time point data associated with a time range in which an element represented by the environment data is estimated to be present in real space on a basis of a time point at which the element was sensed, wherein the element data includes a link to other element data, the at least one piece of the element data being stored in a memory,
 identifying the element data associated with additional environment data constituting a portion or all of environment data generated on a basis of new sensing data;
 associating the element data including the additional environment data with the identified element data; and
 deleting marginal element data, wherein marginal element data corresponds to element data of which the number of links to the element data is a predetermined number or less and for which a time period ranging from a time point indicated by appearance time point data to a time point indicated by disappearance time point data is shorter than a predetermined time period.

8. A non-transitory computer-readable medium including a program, which when executed by an information processing system, causes the information processing system to:
 given at least one piece of element data including environment data generated on a basis of sensing data acquired by a tracker and including sensing time point data associated with a time range in which an element represented by the environment data is estimated to be present in real space on a basis of a time point at which the element was sensed, wherein the element data includes a link to other element data, the at least one piece of the element data being stored in a memory,
 identify the element data associated with additional environment data constituting a portion or all of environment data generated on a basis of new sensing data;
 associate the element data including the additional environment data with the identified element data; and
 delete marginal element data, wherein marginal element data corresponds to element data of which the number of links to the element data is a predetermined number or less and for which a time period ranging from a time point indicated by appearance time point data to a time point indicated by disappearance time point data is shorter than a predetermined time period.

9. An information processing system, comprising:
 circuitry configured to:
 store at least one piece of element data that includes environment data generated on a basis of sensing data acquired by a tracker and that includes sensing time point data associated with a time range in which an element represented by the environment data is estimated to be present in real space on a basis of a time point at which the element was sensed, wherein the element data includes a link to other element data;

identify, according to environment data generated on a basis of new sensing data, the element data associated with additional environment data constituting a portion or all of the generated environment data;

associate the element data including the additional environment data with the identified element data, and delete marginal element data, wherein marginal element data corresponds to element data of which the number of links to the element data is a predetermined number or less and for which a time period ranging from a time point indicated by appearance time point data to a time point indicated by disappearance time point data is shorter than a predetermined time period.

10. The information processing system of claim 9, wherein the circuitry is configured to:

receive designation of a reproduction time point as a time point at which an environmental map is to be reproduced; and identify, from a plurality of pieces of the element data stored in the element data storage section, a plurality of pieces of reproduced element data including the sensing time point data associated with a time range including the reproduction time point.

11. The information processing system of claim 10, wherein the circuitry is configured to generate an environmental map at the reproduction time point by combining the environment data included in each of the identified plurality of pieces of the reproduced element data.

12. The information processing system of claim 11, wherein the circuitry is configured to recursively execute a process of identifying, from among the other element data referenced by the link included in the element data, the element data including the sensing time point data associated with the time range including the reproduction time point, starting from the element data constituted by a given root element.

13. The information processing system of claim 12, wherein the circuitry is configured to generate the environmental map at the reproduction time point by combining the environment data included in each of the plurality of pieces of the reproduced element data identified by the recursive execution of the process.

14. The information processing system of claim 12, wherein the time range associated with the sensing time point data included in the element data includes a time range associated with the sensing time point data included in the element data referenced by the link included in the element data.

15. The information processing system of claim 11, wherein a plurality of pieces of element data stored constitute a network structure such that the longer a time range of any one of the plurality of pieces of element data associated with the sensing time point data included in the element data, the closer that piece of element data is arranged to a root side and that the shorter the time range of a given piece of element data, the closer that piece of element data is arranged to a leaf side.

* * * * *